United States Patent [19]

Silveston et al.

[11] 3,856,927

[45] Dec. 24, 1974

[54] ACCELERATION OF OXIDATION PROCESSES OVER VANADIA CATALYSTS

[76] Inventors: Peter L. Silveston, 550 Glasgow St., Kitchener; Robert R. Hudgins, 196 Bellehaven Dr., Waterloo, Province of Ontario, both of Canada

[22] Filed: July 12, 1972

[21] Appl. No.: 270,933

[52] U.S. Cl. .............................. 423/533, 423/532
[51] Int. Cl. ...................... C01b 17/76, C01b 17/68
[58] Field of Search .......... 423/538, 535, 534, 533, 423/532, 244, 242; 260/687

[56] References Cited
UNITED STATES PATENTS

| | | | |
|---|---|---|---|
| 1,366,439 | 1/1921 | Weber | 423/538 |
| 3,072,457 | 1/1963 | Bloch | 423/214 X |
| 3,312,529 | 4/1967 | Evano | 423/576 X |
| 3,424,560 | 1/1969 | Carmassi et al. | 423/567 X |
| 3,454,356 | 7/1969 | Raman | 423/535 X |

FOREIGN PATENTS OR APPLICATIONS

| | | | |
|---|---|---|---|
| 258,974 | 10/1926 | Great Britain | 423/533 |
| 753 | 3/1871 | Great Britain | 423/533 |
| 832,215 | 4/1960 | Great Britain | 423/532 |
| 443,792 | 3/1936 | Great Britain | 423/533 |

Primary Examiner—Oscar R. Vertiz
Assistant Examiner—Gary P. Straub
Attorney, Agent, or Firm—A. H. Heatley

[57] ABSTRACT

A gaseous mixture comprising an oxidizable substance and oxygen is passed over a vanadia catalyst while one or more of these reaction conditions is cycled:

a. ratio of oxidizable substance to oxygen, b. sum of the partial pressures of oxidizable substance and oxygen, c. the flow rate of the gaseous mixture, d. the temperature at which the gaseous mixture is passed to the catalyst, and e. the temperature of the catalyst itself;

the cycles are of about two to about eight hours duration. Under these conditions the rate of reaction is significantly greater than the rate under steady-state conditions normally used.

2 Claims, No Drawings

ACCELERATION OF OXIDATION PROCESSES OVER VANADIA CATALYSTS This invention relates to oxidation processes which use vanadium pentoxide catalysts. Examples of such processes are the partial oxidation of naphthalene, mixed xylenes or o-xylene to phthalic anhydride, benzene to maleic anhydride, and the oxidation of sulfur dioxide to sulfur trioxide for the production of sulphuric acid. However, the invention is not limited to these four specific processes.

Processes for the production of phthalic anhydride are well known in which molten naphthalene is vaporized by bubbling preheated air through the melt, and additional air is added to bring the air-naphthalene ratio to 18 to 22:1 by weight. The vapor is passed over the catalyst at a temperature of about 650° to 850°F. The catalyst is contained inside tubes immersed in mercury or a molten salt which serves to remove the heat of reaction. Phthalic anhydride and by product maleic anhydride are recovered in condenser banks located after a gas cooler. The support for the potassium sulfate promoted vanadia catalyst may be either silica gel or alumina. Yields of 70 to 80 percent are normal with essentially complete oxidation of the naphthalene. O-xylene or mixed xylenes may be substituted for naphthalene. Maleic anhydride may be obtained from benzene using the same process.

Processes for the production of sulfuric acid are well known in which elemental sulfur is burned in an excess of air to produce a gaseous reaction mixture consisting essentially of about 7 to 12 percent sulfur dioxide, about 10 to 14 percent oxygen, and the remainder nitrogen. The reaction mixture is cooled to a temperature of about 410° to 460°C. usually in a heat exchanger producing steam, and passed over catalyst beds in several stages, usually with cooling and/or absorption of sulfur trioxide in sulfuric acid between stages. The catalyst may be vanadium pentoxide or platinum or a platinum group metal supported on a suitable carrier. In the final stages the sulfur dioxide is essentially completely converted to sulfur trioxide which is absorbed in sulfuric acid. Alternatively, the sulfur dioxide may be obtained from various manufacturing processes, for example from the waste gases of metallurgical smelters, processed to obtain a gaseous reaction mixture with suitable concentrations of sulfur dioxide, oxygen and diluent.

In these well known processes the standard practice is to conduct the process with the various conditions held constant within the narrowest practical limits. We have now found that when the catalyst is vanadium pentoxide, which may be "promoted" or not, the average rate of the above noted reactions is increased by varying one of more of the reaction conditions:
a. the ratio of the partial pressures of the oxidizable substance to oxygen,
b. the sum of the said partial pressures,
c. the flow rate of the reaction gas mixture,
d. the temperature at which the reaction gas mixture is passed to the catalyst, and
e. the temperature of the catalyst.

The variation is carried out in cycles ranging from about 2 hours to about 8 hours; cycles in the range of about 4 hours to about 5 hours are preferred. The variation may be made in various ways; for example it may have a square wave form, where the variation from one limit of the reaction condition to the other limit is made abruptly, or it may have a wave form approximating a sine curve, where the variation is smooth and continuous.

The effectiveness of vanadium pentoxide to increase the rate of oxidation under these variations is believed to be due to its unusual nature. The oxygen in its lattice is mobile and capable of re-oxidizing surface sites where oxidation of the reactant is occurring. However our invention is not limited by the theory of the mechanism of the reaction.

Theoretical studies by J. M. Douglas (I. and E.C. Proc. Des. and Dev. 6, 43 (1967)) have indicated that in the case of a single reactant the capacity of a reactor could be increased by cycling the feed rate. His study did not include the effect of cycle periods or the extent of the variations.

In their experiments on the catalytic dehydrogenation of ethyl alcohol Denis and Kabel (Chem. Eng. Sci. 25, 1057 (1970) and A.I.Ch.E.J. 16, 972 (1970)) found that the reaction rate was lower when the flow rate was cycled than when it was steady.

The process of the invention is illustrated but not limited by the following examples.

The reactor consisted of a stainless steel tube, one quarter inch inside diameter, submerged in a bed of fluidized sand maintained at a constant temperature. In the reactor was a single bed of vanadia catalyst weighing 0.31 grams, the particle size of which was very small, about 0.5 mm., to avoid diffusional interference. Appropriate control valves and calibrated manometers were arranged to feed dry nitrogen, sulfur dioxide, and oxygen, through a mixing manifold and a preheater to the reactor. The control valves were set to provide a constant flow of nitrogen and a constant flow of sulfur dioxide plus oxygen. For half of a selected time cycle the sulfur dioxide/oxygen ratio was held at a selected value; for the other half of the cycle the ratio was held at a different but constant value. The exit gas during each cycle, accurately timed, was absorbed in a solvent at −72°C, which was later analyzed for sulfur trioxide by a standard procedure accurate to about 1 percent. The average rate of reaction for the cycle was expressed as gram moles of sulfur trioxide produced per hour per gram of catalyst.

In the first example, the temperature of the sand bath was held at 405°C. The total gas flow was held at 41.3 grams per hour, and the pressure was about one atmosphere, and the mol ratio (i.e. the ratio of the partial pressures) of sulfur dioxide to oxygen was held at a constant value of 0.6 for a few days to establish the rate of reaction at this ratio. The ratio was then raised to and held at 0.9 for a period of time, after which it was lowered to and held at 0.3 for an equal period of time, while maintaining the sum of the partial pressures of the reactants at its original value of about 0.32 atm. This cycle was repeated about 15 times. The rates of reaction were reproducible within close limits; the average is reported.

In these examples the high-level and low-level ratios of 0.3 and 0.9 respectively are variations of 0.3 from the average ratio, 0.6. The observations are shown in Table 1.

TABLE 1

| Example No: | Cycle Period Minutes | Rate × 10³ * |
|---|---|---|
| 1a | Steady State | 3.1 |
| 1b | 40 | 3.1 |
| 1c | 60 | 3.0 |
| 1d | 120 | 3.15 |
| 1e | 240 | 3.75 |
| 1f | 360 | 3.55 |
| 1g | 720 | 3.1 |

* Gram moles of sulfur trioxide produced per hour per gram of catalyst.

In the second example, carried out in the same reactor, the temperature, the total pressure, the total flow rate, the sum of the pressures of the reactants, and the average mol ratio of sulfur dioxide to oxygen were held at the same values as in Example 1. In the successive parts of the example the cycle period was held constant at 240 minutes and there were different sets of high-level and low-level ratios. The data are in Table 2.

TABLE 2

| Example No: | Mol Ratios Low-Level | Mol Ratios High-Level | Variations | Rate × 10³ * |
|---|---|---|---|---|
| 2a | 0.6 | 0.6 | Zero | 3.1 |
| 2b | 0.5 | 0.7 | 0.1 | 3.1 |
| 2c | 0.4 | 0.8 | 0.2 | 3.52 |
| 2d | 0.3 | 0.9 | 0.3 | 3.93 |
| 2e | 0.2 | 1.0 | 0.4 | 3.81 |

* Gram moles of sulfur trioxide produced per hour per gram of catalyst.

In the third example, also carried out in the same reactor, the temperature, the total pressure, the total flow rate and the sum of the partial pressures of the reactants were held at the same values as in the preceding examples. The cycle period was 240 minutes. Three different average mol ratios were used. The data are in Table 3.

TABLE 3

| Example No: | Mean | Mol Ratios Low-Level | Mol Ratios High-Level | Variations | Rate × 10³ * |
|---|---|---|---|---|---|
| 3a | 0.3 | 0.2 | 0.4 | 0.1 | 1.3 |
| 3b | 0.6 | 0.3 | 0.9 | 0.3 | 3.9 |
| 3c | 0.9 | 0.6 | 1.2 | 0.3 | 4.5 |

* Gram moles of sulfur trioxide produced per hour per gram of catalyst.

As noted above cyclic variations in the ratio of oxidizable substance to oxygen significantly increase the reaction rate. We have also found that cyclic variations in the sum of the partial pressures of the reactants, even when the said ratio is kept constant, significantly increase the reaction rate. However, the simultaneous cycling of the said ratio and the said sum of the partial pressures of the reactants is also effective to achieve a significant increase in reaction rate and lies within the ambient of our invention. For example, this simultaneous ambit may be achieved by cycling the partial pressure of only one of the reactants. On the other hand, the partial pressures of both reactants must be cycled in the same direction and by the same factor if their ratio is to be maintained constant while the sum of the partial pressures is cycled. Preferably the ratio of the partial pressures is varied from an average value within the range from about 0.6 to about 1.1 and the positive and negative variations from the said average are within the range from about 0.2 to about 0.5. Preferrably the sum of the partial pressures of the reactants is varied from an average value within the range from 0.18 to 3.0 atm. and the positive and negative variations from the said average are within the range from about 0.04 to about 0.6 atm. A numerical example is given in Table 4 to illustrate but not to limit the three cases:

a. the ratio of the partial pressures is cycled while their sum is kept constant,
b. the ratio is kept constant while the sum is cycled, and
c. both ratio and sum are cycled.

In all three cases the total pressure is one atmosphere.

TABLE 4

Three cases of cycling.

| | Average Value Partial Pressure (atm.) | Average Value Ratio | Low-level value Partial Pressure (atm.) | Low-level value Ratio | High-level value Partial Pressure (atm.) | High-level value Ratio |
|---|---|---|---|---|---|---|
| | Case A. | Ratio cycled. | Sum constant. | | | |
| Oxidizable Subs. | 0.12 | 0.6 | 0.074 | 0.3 | 0.152 | 0.9 |
| Oxygen | 0.20 | | 0.246 | | 0.168 | |
| SUM | 0.32 | | 0.32 | | 0.32 | |
| | Case B. | Ratio constant. | Sum cycled. | | | |
| Oxidizable Subs. | 0.12 | 0.6 | 0.096 | 0.6 | 0.144 | 0.6 |
| Oxygen | 0.20 | | 0.16 | | 0.24 | |
| SUM | 0.32 | | 0.256 | | 0.384 | |
| | Case C. Both ratio and sum cycled. | | | | | |
| Oxidizable Subs. | 0.12 | 0.6 | 0.06 | 0.3 | 0.18 | 0.9 |
| Oxygen | 0.20 | | 0.20 | | 0.20 | |
| SUM | 0.32 | | 0.26 | | 0.38 | |

The rate of reaction is likewise increased significantly when the flow rate is varied in a cyclic manner over the rate when the flow is maintained constant. Preferrably the average rate is in the range from about 20 to about 200 pounds of the reaction gas mixture per hour per pound of catalyst and the positive and negative variations are within the range from about 4 to about 50.

Cyclic variations in the temperature at which the gas is passed to the catalyst or in the temperature of the catalyst itself also significantly increase the reaction rate over that obtained with a constant temperature. Obviously these variations must not take the temperature downward to values where the normal catalytic activity is significantly diminished, nor upward to values where equilibrium considerations have a significant adverse effect. Preferably the average temperature at which the gas is passed to the catalyst is within the range from 380°C. to 550°C. and the positive and negative variations from the said average are within the range from about 5°C to about 50°C. Preferably the average temperature of the catalyst is within the range from about 420°C to about 600°C and the positive and negative variations from the same average are within the range from about 5°C to about 25°C.

What is claimed is:

1. In a process for producing sulfur trioxide which comprises passing a gaseous reaction mixture comprising oxygen and sulfur dioxide over vanadium pentoxide catalyst, the improvement which comprises: carrying out the reaction while the ratio of partial pressure of sulfur dioxide to oxygen is varied in cycles from a value selected from the range of about 0.6 to about 1.1 and the positive and negative variations from said value are within the range from about 0.2 to about 0.5 and are of equal magnitude, said cycles being of about 2 to 8 hours duration.

2. The improvement of claim 1, wherein the said cycles are of about 4 to 6 hours duration.

* * * * *

UNITED STATES PATENT OFFICE
CERTIFICATE OF CORRECTION

Patent No. 3,856,927　　　　　　　　Dated 24th December 1974

Inventor(s) Peter L. Silveston, Robert R. Hudgins

It is certified that error appears in the above-identified patent and that said Letters Patent are hereby corrected as shown below:

Column 1, line 50 - after "various" insert - reaction -

Column 4, line 10 - alter "ambient" to - ambit - line 11 - alter "ambit" to - cycling -

Signed and sealed this 7th day of June 1975.

(SEAL)
Attest:

RUTH C. MASON
Attesting Officer

C. MARSHALL DANN
Commissioner of Patents
and Trademarks